United States Patent [19]
Gitman

[11] Patent Number: 4,622,007
[45] Date of Patent: Nov. 11, 1986

[54] VARIABLE HEAT GENERATING METHOD AND APPARATUS

[75] Inventor: Grigory M. Gitman, Duluth, Ga.

[73] Assignee: American Combustion, Inc., Norcross, Ga.

[21] Appl. No.: 642,141

[22] Filed: Aug. 17, 1984

[51] Int. Cl.⁴ .................. F27B 14/00; F23D 11/10; F23D 15/00; F23M 3/04

[52] U.S. Cl. .................. 432/13; 239/419.3; 239/423; 431/10; 431/181; 431/351; 431/352

[58] Field of Search .............. 432/13; 431/10, 165, 431/181, 351, 352; 239/422, 423, 424, 424.5, 425, 419.3, 419.5

[56] References Cited

U.S. PATENT DOCUMENTS

| | | |
|---|---|---|
| 2,368,370 | 1/1945 | Maxon, Jr. .................. 431/249 |
| 2,398,884 | 4/1946 | Crowe .................. 239/423 |
| 2,458,543 | 1/1949 | Urquhart .................. 431/10 |
| 2,655,986 | 10/1953 | Pennington .................. 239/105 |
| 3,092,166 | 6/1963 | Shepherd .................. 431/9 |
| 3,208,502 | 9/1965 | Carlson .................. 431/188 |
| 3,266,552 | 8/1966 | Denis .................. 138/76 |
| 3,418,062 | 12/1968 | Hovis et al. .................. 431/350 |
| 3,455,514 | 7/1969 | Fenley, Jr. .................. 239/419 |
| 3,545,903 | 12/1970 | McCullough .................. 431/13 |
| 3,563,683 | 2/1971 | Hess .................. 431/160 |
| 3,612,738 | 10/1971 | Jones et al. .................. 431/265 |
| 3,729,285 | 4/1973 | Schwedersky .................. 431/351 |
| 3,748,082 | 7/1973 | Ivernel .................. 239/422 |
| 3,856,457 | 12/1974 | Miller .................. 431/353 |
| 3,889,933 | 6/1975 | Jaquay .................. 266/44 |
| 4,017,253 | 4/1977 | Wielang et al. .................. 432/58 |
| 4,173,499 | 11/1979 | Holemann .................. 239/422 |
| 4,342,551 | 8/1982 | Browning .................. 431/10 |
| 4,422,624 | 12/1983 | Dunham et al. .................. 266/182 |
| 4,473,350 | 9/1984 | Gitman .................. 431/160 |
| 4,475,885 | 10/1984 | Finke .................. 431/182 |

FOREIGN PATENT DOCUMENTS 188221 10/1966 U.S.S.R. .
635361 11/1978 U.S.S.R. .

Primary Examiner—John J. Camby
Attorney, Agent, or Firm—Sumner C. Rosenberg; William H. Needle

[57] ABSTRACT

Method and apparatus for high temperature heating, melting, refining and superheating of materials, such as steel scrap, metals, ceramics or glass. The invention provides an economizing method of hydrocarbon fluid fuel combustion in an ongoing flame in a liquid cooled combustion chamber by separately supplying streams of fuel and at least two oxidizing gases wherein a first oxidizing gas reacts with the fuel, and a second oxidizing gas is directed about the flame core to further react with the fuel, while controlling the flow of the fuel, the oxidizing gases and cooling liquid to provide the required heat input, combustion product chemistry, temperature, velocity, emissivity and combustion block temperature. Also disclosed are burners for carrying out the invention.

44 Claims, 6 Drawing Figures

VARIABLE HEAT GENERATING METHOD AND APPARATUS

BACKGROUND OF THE INVENTION

This invention relates to a method and apparatus for high temperature heating, melting, refining and superheating of materials, such as steel scrap, metals, ceramics or glass. The method and apparatus disclosed may be used as the major source of energy and also as an assisting energy source in melting furnaces, industrial heating and heat treating furnaces, kilns, incinerators and other high temperature applications.

Today, scrap preheating and melting is accomplished by different technologies, such as heat from the combustion of coke, oil or gas with air or oxygen, or from electric arc. Each of these technologies has some advantages and disadvantages. Using air for combustion has the advantage of being a low cost oxidizer, but, because air only contains 21% oxygen, it has the following disadvantages: low flame temperature, combustion instability inside cold scrap, low efficiency of heat utilization when scrap is hot due to escaping flue gases which waste about 50% of heat released by combustion.

The advantages of using essentially pure oxygen for combustion include: high flame temperature, good combustion stability, and a significant reduction of wasting heat with hot flue gases. The disadvantages of oxygen include its high cost and the necessity to cool the oxygen-fuel burner body. The utilization of electrical energy is very expensive, but it provides a convenient means of operation and high product quality.

Burners for combusting fuel with air are old in the art, and burners for combusting fuel with pure oxygen (oxy-fuel) are well known. Furthermore, oxygen enriched air has been used as the oxidizer in burners. However, the current state of the art burners do not operate satisfactorily across the full range of temperatures useful in high temperature heating, and do not allow for economical operation through control of flame chemistry, temperature, velocity and luminosity. Burners designed for use with hot air or oxygen enriched air typically use refractory tiles in the burner for continuous igniting of gases to stabilize the flame. However, due to the very high temperature of an oxy-fuel flame, refractory tiles cannot be used, and such burners are internally water or air cooled. The elimination of the burner tile results in flame instability at lower temperatures and therefore limits the turn-down ratio of oxygen enriched air burners.

Another problem that often arises in oxy-fuel and oxygen enriched burners is the presence of excess oxygen in the flue gases. The hot furnace temperatures, together with the excess oxidizing ability of the flue gases, accelerate deterioration of expensive furnace components.

Also, in cases where natural gas is utilized as a fuel, an oxygen-fuel flame or an oxygen enriched air-fuel flame is not emissive. To be able to transfer heat, the flame would therefore have to touch the product being heated. This can create a problem with product distortion and oxidation. Improved emissivity of natural gas flames is a priority concern of this invention.

SUMMARY OF THE INVENTION

In general, the total cost (operating and capital) of transferring of each BTU into a product being heated varies for each particular application as a function of temperature. As the temperature of the product increases, it becomes more expensive to transfer additional BTUs from the source of energy into the product being heated.

The least expensive way to accomplish heat transfer to the product at the low temperature stage of the heating cycle is to increase the flame velocity to increase the convective heat flux from the source of energy to the product being heated. When the product temperature exceeds approximately 1500°-1700° F. the most efficient way of heat transfer is to increase the flame temperature and flame luminosity to increase the radiative heat flux from the source of energy to the product. This changing of the flame, to go from convective heating to radiative heating, is accomplished in this invention by continuously optimizing the fuel-air-oxygen flame chemistry to control temperature, velocity, luminosity and heat input. Furthermore, in the case of melting, if some components of the product being heated can be oxidized through exothermic reactions without reducing the product quality, excess oxidizing mixture or pure oxygen can be directed toward the hot zone of the product being heated to generate intensive exothermic reactions on the surface and inside the product. To improve the ability of excess oxidizing mixture, or pure oxygen, to penetrate inside the product, the excess oxidizing mixture or pure oxygen may be introduced with supersonic velocity.

Utilization of the present invention for metal scrap heating, melting and refining includes the steps of: initial heating of the scrap pile with a fluid fuel-air flame with some oxygen being introduced inside the flame core for mixing with the fluid fuel to form a stable combustion zone, which is used as a continuous ignitor during the combustion step, with the total oxygen/fuel ratio near stoichiometric; increasing the oxygen/air ratio to raise the flame temperature with the total oxygen/fuel ratio still close to stoichiometric; introducing through the fluid fuel-air-oxygen flame a jet of excess oxygen directed to the hot scrap pile when it is preheated above 1600°, to start exothermic oxidation reactions to accelerate scrap melting; increasing oxygen velocity above sonic to enable the oxygen jet to penetrate deeply inside the scrap pile and also to protect the excess oxygen jet from mixing with the combustion product; heating the molten metal during refining with a fluid fuel-air flame (or a fluid fuel-air-oxygen flame); refining the molten metal by oxidation of the molten metal surface with a subsonic jet of oxygen directed through the fluid-air flame (or the fluid fuel-air-oxygen flame) toward the molten metal; refining the molten metal with a supersonic jet of oxygen directed through the flame toward the molten metal.

It is an object of this invention to minimize energy consumption and cost of heating, melting and refining operations by increasing the efficiency of heat generation and utilization by continuously optimizing the fuel-air-oxygen flame chemistry, temperature, velocity, luminosity, and heat input.

It is also an object of this invention to introduce through a burner flame a combination of subsonic and supersonic oxygen jets for oxidation and refining of hot materials.

It is a further object of this invention to provide a burner with assured flame stability over a broad operating range.

It is a still further object of this invention to provide a heating method and apparatus which reduces flue gas volume and pollutants.

It is yet another object of this invention to automatically control and optimize the heating, melting and refining of materials.

These and other objects and advantages will appear from the following description with reference to the drawings.

DESCRIPTION OF PREFERRED EMBODIMENT

The preferred embodiments are now described with reference to the drawings, in which like numbers indicate like parts throughout the views.

Figure 1:
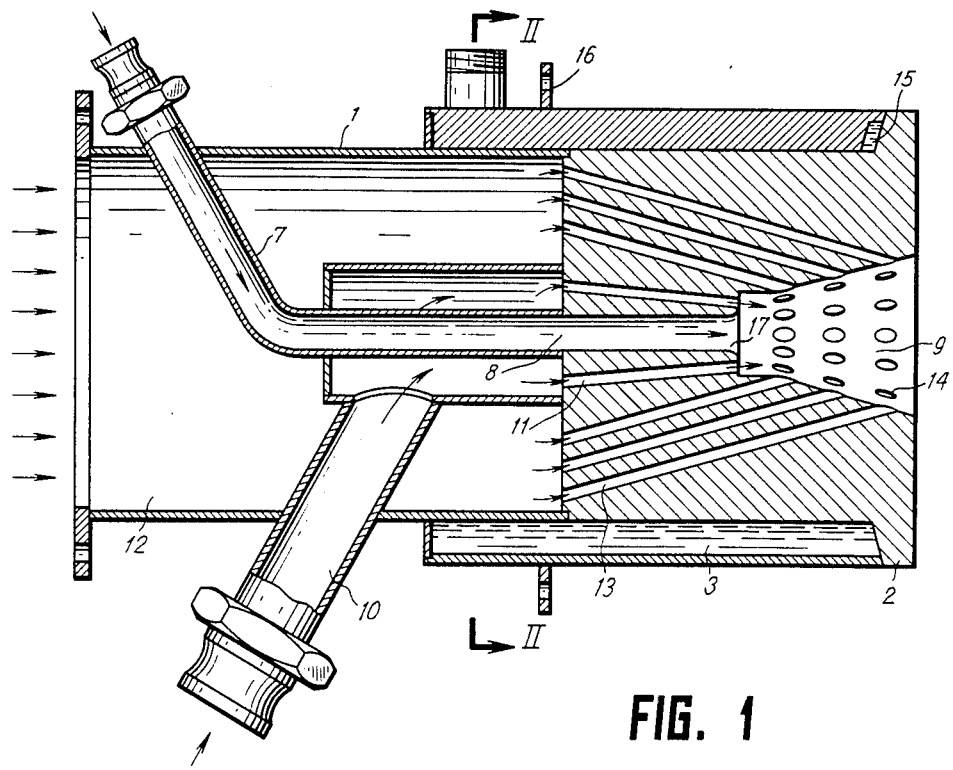
FIG. 1 is a side cross-sectional view through the center of a flame generator illustrating a first embodiment of the invention.
Figure 2:
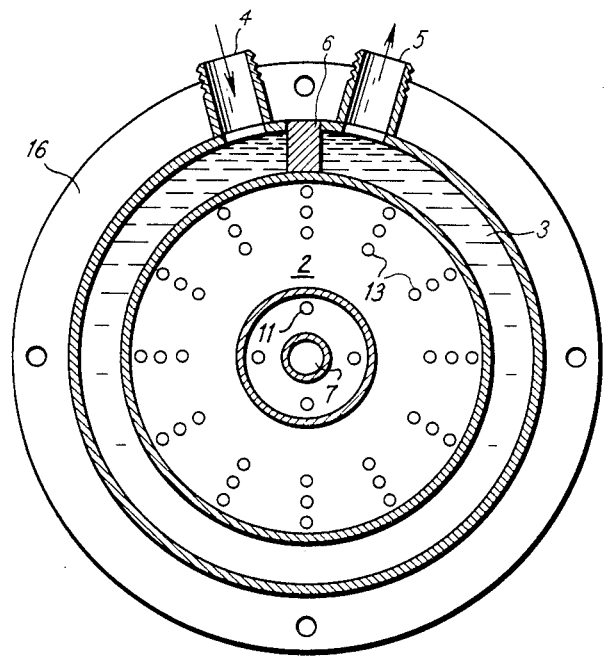
FIG. 2 is a rear cross-sectional view of the flame generator of FIG. 1, taken along lines II—II of FIG. 1.

FIGS. 1 and 2 show a first embodiment of the flame generator 1, which comprises a generator combustion block 2. A water cooling jacket 3 surrounds the generator combustion block 2, and has a water inlet 4 and outlet 5 located next to each other, and a dividing plate 6 between the inlet 4 and the outlet 5 to cause the cooling water to circulate around the combustion block 2. An oxygen conduit 7 connects to the oxygen channel 8 through the combustion block 2 for introducing oxygen into the conical combustion chamber 9 of the combustion block. A fluid fuel conduit 10 provides fluid fuel to a plurality of fuel channels 11 through the combustion block 2, said channels spaced symmetrically around the oxygen channel 8, and preferably angled to direct the fuel to a point in the center of the combustion block within the combustion zone 9. Additionally, an air supply conduit 12 provides air to a plurality of air channels 13 through the combustion block 2. Preferably, the air channels 13 are symmetrically spaced radially outward from the fuel channels 11, with openings 14 on the conical face of the combustion zone 9. In addition to supplying oxidizing gas to participate in the combustion reaction, gas introduced through openings 14 will serve to protect the wall of the combustion chamber from the high temperature combustion product by creating a thin gas film between the wall and the combustion product. Furthermore, the combustion block 2 may be further cooled by the passing of cool air through the air channels 13 and cool fuel through the fuel channels 11 as they are introduced into the combustion chamber 9. A slot 15 is provided to the cooling jacket 3 for evacuation of air and steam bubbles. Flange 16 provides a means for fixing the flame generator to a furnace.

Figure 3:
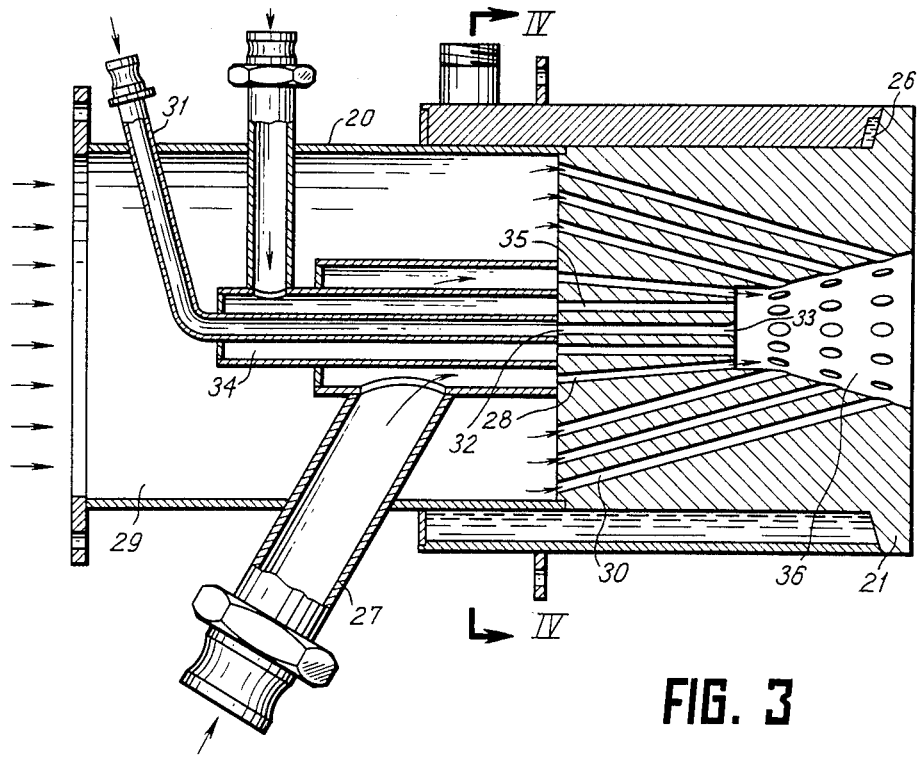
FIG. 3 is a side cross-sectional view through the center of a flame generator illustrating a second embodiment of the invention.
Figure 4:
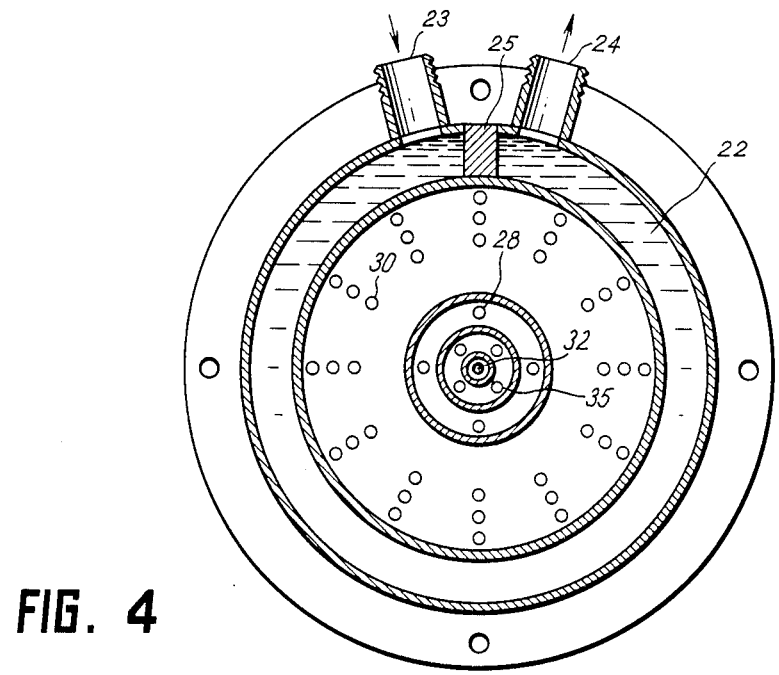
FIG. 4 is a rear cross-sectional view of the flame generator of FIG. 3, taken along line IV—IV of FIG. 3.

FIGS. 3 and 4 show a second embodiment of a flame generator 20. Similar to the previous embodiment, this embodiment includes a combustion block 21, a water cooling jacket 22 with water inlet 23, water outlet 24, dividing plate 25, and evacuating slot 26. Additionally, the fuel conduit 27, fuel channels 28, air conduit 29 and air channels 30 are similar to the previous embodiment. A first oxygen conduit 31 connects to a channel 32 through the combustion block 21 along its center line, with a converging-diverging nozzle 33 for directing a supersonic jet of oxygen to a product being heated. A second oxygen conduit 34 is connected to channels 35 through the combustion block 21 parallel to its center line and spaced radially between channel 32 and channels 28, for delivering a subsonic jet of oxygen to the combustion chamber 36.

Figure 5:
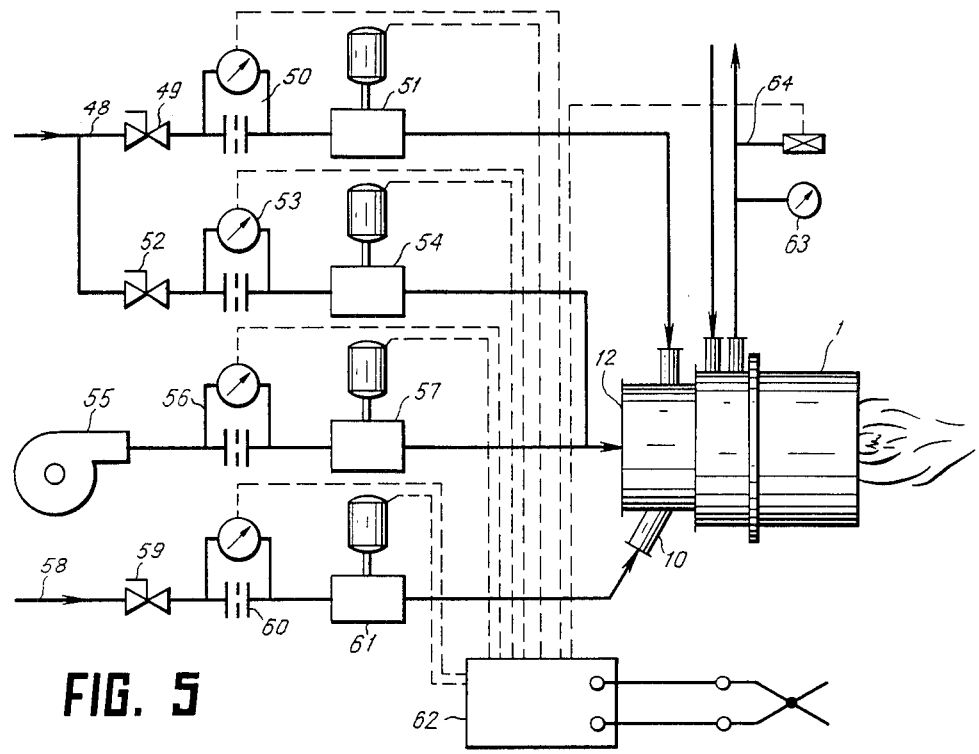
FIG. 5 is a schematic diagram of the control system for the first embodiment of the invention.

FIG. 5 shows the control system for the first embodiment of the flame generator. When the flame generator 1 is in operation, cooling water is supplied from a water supply line to water inlet 4 then around the combustion block 2 inside the water jacket 3 and escapes through outlet 5. The required cooling rate is controlled by thermocouple 63 and pressure gauge 64. To provide intensive cooling of all surface areas of the flame generator block 2 said block is made of copper or other material with very high thermal conductivity.

Concurrently, fuel is delivered from fuel supplying line 58 through valve 59, flowmeter 60 and controlling valve 61 to the flame generator 1 and then through fuel conduit 10 and the plurality of fuel channels 11 into combustion chamber 9. The oxidizer is delivered into combustion chamber 9 by different ways depending on whether the process is in the stage of heating, melting or superheating. When the temperature of the material being heated is relatively low, the ratio of air/oxygen will be relatively high and an air jet is delivered from blower 55, through flow meter 56, controlling valve 57, air conduit 12 and the plurality of air channels 13 into combustion chamber 9. At the same time, an oxygen jet can be delivered from oxygen line 48 into combustion chamber 9 by one or both of the following two ways: first, through valve 49, flowmeter 50, controlling valve 51, oxygen conduit 7 and oxygen channel 8; and second, through valve 52, flowmeter 53, controlling valve 54, air conduit 12, and the plurality of air channels 13.

An automatic control device 62 controls the various supplies of oxygen, air and fuel based on the input from the various pressure and temperature gauges or sensors, and further based on the type of material being heated, the temperature within the furnace, or the stage of the process as determined by a timer in the control device. Preferably, the control device 62 is a micro-processor which can be programmed to control various processes as applied to various materials.

In a typical process, as the temperature of the material being heated increases, more oxygen is introduced into the combustion chamber 9, thereby lowering the air/oxygen ratio and increasing the temperature of combustion. The ratio of fuel/total oxygen during this stage is maintained close to stoichiometric.

When the temperature of the material being heated achieves a point that makes utilization of the exothermic reactions of oxidation economically reasonable, a jet of excess oxygen will be directed through oxygen conduit 7 and oxygen channel 8, through the center of the flame filling the combustion chamber 9, toward the hot product for the generation of oxidation reactions. To increase the ability of the jet of excess oxygen to penetrate into the material being heated, the oxygen jet can be blown through converging-diverging nozzle 17 of oxygen channel 8 with supersonic velocity. This will also reduce dilution of oxygen with the combustion product and the furnace atmosphere.

A jet of excess oxygen can also be directed through the flame filling the combustion chamber 9 toward molten material for refining or other purposes. The velocity of this excess oxygen jet can be increased above sonic to improve the ability of the jet to penetrate into the molten material. At the same time, a fuel-air, fuel-oxygen, or fuel-air-oxygen flame can be directed at the molten material to heat the material about and inside the oxidation zone.

The operation of the flame generator 20 includes all the steps described above for the first embodiment of the flame generator. In addition, oxygen may be delivered in the central zone of the combustion chamber 36 with velocity above sonic through oxygen conduit 31 with converging-diverging nozzle 33, while also being delivered with subsonic velocity through the plurality of oxygen channels 35. The positioning of the plurality of oxygen jets delivered by channels 35 will separate the central jet of oxygen from the combustion products formed inside combustion chamber 36 by the combustion of fuel with air and oxygen delivered through conduits 27, 29 and 34, respectively. This option increases the flexibility of the flame generator to vary the properties of the flame and the excess oxygen jet directed through the central portion of the combustion chamber.

Figure 6:
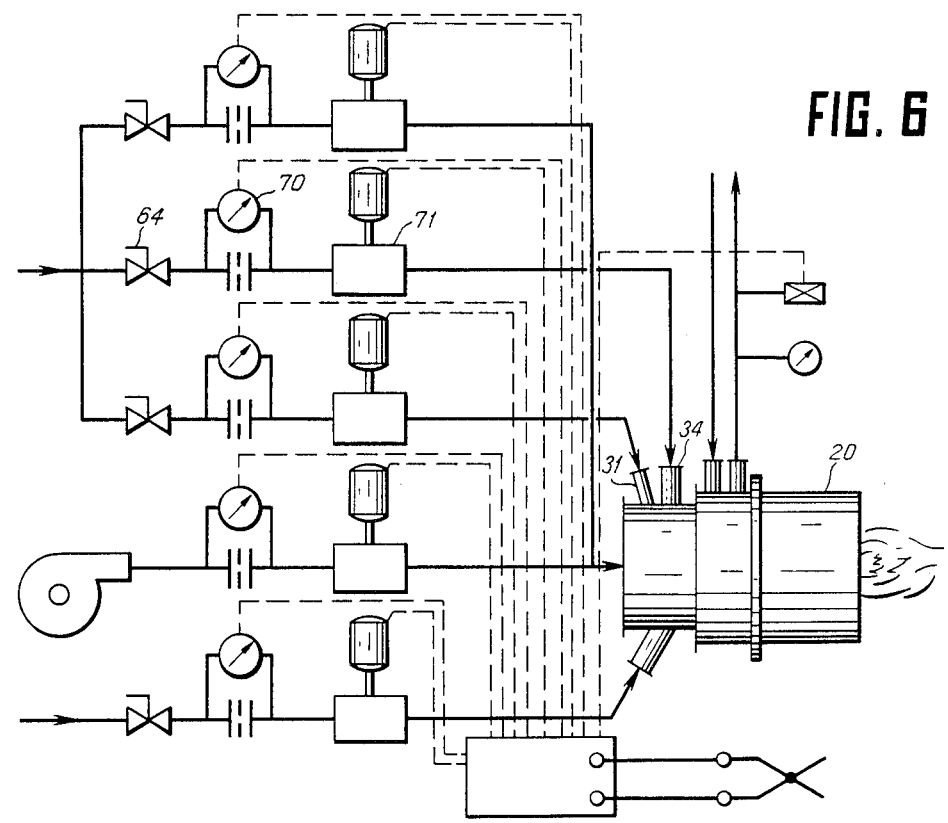
FIG. 6 is a schematic diagram of the control system for the second embodiment of the invention.

The control system for this embodiment is shown in FIG. 6. It is essentially the same as FIG. 5, except for the addition of a supply line with valve 69, flowmeter 70, and controlling valve 71 to oxygen conduit 34.

During the heating, melting, refining and superheating cycles the heat input, flame velocity, temperature, luminosity, shape of the flame envelope and the chemistry of the combustion product are controlled continuously by variation of the supply of fuel, air, and oxygen and also by variation of the ways these components are introduced into the combustion chamber, in order to satisfy the heating requirements with minimum operating cost. Thus, the amount of heat input from a burner is directly related to the amount of hydrocarbon fuel delivered into the burner. As described above, the invented process or apparatus provides oxygen to the combustion process either as pure oxygen or as air or a mixture of both. By controlling the ratio of fuel/total oxygen provided to the combustion process, the stoichiometric ratio at which complete combustion of the oxygen and fuel occurs, may be maintained as desired to efficiently utilize the substance introduced into the burner. Furthermore, at any given fuel/total oxygen ratio, the temperature of the flame may be increased by causing the oxidizing gas to have a higher oxygen concentration. This is accomplished by varying the air and pure oxygen supplied to the burner to control the air/total oxygen ratio. Although supplying pure oxygen is clearly more expensive than the use of air, at some point in a process the higher flame temperature may be desirable to more efficiently transfer heat to the product.

Another way to improve heat transfer is to increase the emissivity of the flame. A highly emissive flame comes from the conversion of excess atomic carbon from the hydrocarbon fuel into highly emissive molecular carbon inside the core of the flame. This is accomplished in the present invention by providing a small amount (10-30 percent) of oxygen in the core of the flame relative to the oxygen provided to the outer part of the flame. Therefore, by controlling the ratio of hydrocarbon fuel/oxygen in the center of the flame while maintaining all other parameters at the desired values, the emissivity of the flame may be controlled.

Additionally, it is desirable to provide a burner that will eliminate or substantially reduce the NOx emissions which result from combustion with air at high temperatures (e.g. core temperature over 2700° F.). This may be accomplished by reducing air inside the flame core. Therefore NOx may be reduced by controlling and maximizing the ratio of air introduced to the outside of the flame/air introduced to the center of the flame, for any given total air content to be introduced into the combustion chamber.

The burner described herein may utilize preheated air or a preheated air-oxygen mixture as an oxidizing gas. This may allow recovery of waste heat from the process to provide the preheated air or a preheated air-oxygen mixture and make the operation more efficient. By providing the hot gas under pressure and designing the channels to have a relatively small surface area, the hot gas will not be significantly cooled by the cooling of the combustion block nor will the hot gas interfere with the cooling of the combustion block.

While the invention has been disclosed with fuel, oxygen and air being supplied through their respectively identified conduits, it should be understood that the fuel, air and oxygen supplies may be interchanged and the flame generator will still be able to function.

While this invention has been described in detail with particular reference to preferred embodiments thereof, it will be understood that variations and modifications can be effected within the spirit and scope of the invention as previously described and as defined in the claims.

What is claimed is:

1. An economizing method of hydrocarbon fluid fuel combustion in an ongoing hydrocarbon flamed formed in a combustion chamber within a fluid cooled combustion block, to reduce the consumption of fuel and pure oxygen in heating processes, comprising the steps of:
   separately supplying hydrocarbon fluid fuel and two different oxygen based oxidizing gases to a fluid cooled combustion chamber;
   directing said first oxidizing gas having a given oxygen concentration in a jet along the central axis of the combustion chamber;
   directing said hydrocarbon fuel into said combustion chamber in a plurality of jets about the central jet of said first oxidizing gas so that said hydrocarbon fuel is caused to be mixed with said first oxidizing gas to stabilize combustion within the combustion chamber;
   directing said second oxidizing gas having different oxygen concentration from said first oxidizing gas into said combustion chamber in a plurality of jets directed to mix inside said combustion chamber with said hydrocarbon fuel in the flame core, and to mix with the hydrocarbon fuel outside said combustion chamber, creating the final flame pattern; and
   controlling the flow if said hydrocarbon fuel and said two oxidizing gases.

2. The method of hydrocarbon fluid fuel combustion of claim 1, wherein said flow controlling step comprises the steps of:
   controlling the ratio of fuel to total oxygen in said two oxidizing gases to enable efficient use of both said fuel and said oxidizing gases; and
   controlling the concentration of oxygen in said two oxidizing gases by adding controlled amounts of air for controlling the temperature of the hydrocarbon flame.

3. The method of hydrocarbon fluid fuel combustion of claim 2, wherein said flow controlling step further comprises the step of controlling the ratio of hydrocarbon fuel to the oxygen in said first oxidizing gas for controlling the emissivity of the hydrocarbon flame.

4. The method of hydrocarbon fluid fuel combustion of claim 3, wherein said flow controlling step further comprises the step of maximizing the ratio of air in said second oxidizing gas to the air in said first oxidizing gas for minimizing NOx emissions by reducing the amount of air inside the core of the hydrocarbon flame.

5. The method of claim 2, 3 or 4 which further comprises the step of monitoring the current process temperature for determining the appropriate ratios for said controlling steps as the process continues.

6. The method of claim 2, 3 or 4 which further comprises the step of timing the process for determining the stage of the process and the ratios to be applied in said controlling steps.

7. The method of claim 5, wherein said controlling steps are accomplished by electronic computer means.

8. The method of claim 6, wherein said controlling steps are accomplished by electronic computer means.

9. The method of hydrocarbon fluid fuel combustion of claim 1, 2 or 3 wherein said first oxidizing gas is pure oxygen.

10. The method of hydrocarbon fluid fuel combustion of claim 2, 3 or 4 which further comprises the step of controlling the delivery of said first oxidizing gas into the combustion chamber such that the velocity of the jet entering the combustion chamber may range from subsonic to supersonic.

11. The method of hydrocarbon fluid fuel combustion of claim 5, which further comprises the step of controlling the delivery of said first oxidizing gas into the combustion chamber such that the velocity of the jet entering the combustion chamber may range from subsonic to supersonic.

12. The method of hydrocarbon fluid fuel combustion of claim 6, which further comprises the step of controlling the delivery of said first oxidizing gas into the combustion chamber such that the velocity of the jet entering the combustion chamber may range from subsonic to supersonic.

13. The method of claim 1 or 4, which further comprises the step of directing said hydrocarbon fuel and said second oxidizing gas through a plurality of channels in the combustion block prior to directing said fuel and said second gas into the combustion chamber, for further cooling the combustion block.

14. A method of heating and melting materials in a furnace, comprising the steps of:
directing a flame to the material to be heated, said flame formed by combusting a mixture of supplied oxygen, air, and hydrocarbon fuel having a ratio of total oxygen to total air less than 40 percent and a ratio of fuel to total oxygen about stoichiometric;
raising the ratio of total oxygen to total air in the mixture, to increase the flame temperature, as the temperature of the material increases, while maintaining the fuel to total oxygen ratio at stoichiometric, to achieve a temperature of the material at which an exothermic reaction of oxidation of some component of the material can be initiated; and
then introducing excess oxygen directed to the hottest zone of the material, to increase the oxidation ability of the flame and initiate an exothermic oxidation reaction between the oxygen and the material.

15. The method of claim 14, also used to refine the material, which further comprises the steps of:
after the material is generally melted, reducing the fuel and air supplied to the combustion mixture, to rearrange the flame pattern;
directing a first jet of oxygen at supersonic velocity through the flame to the material; and
penetrating said first supersonic jet of oxygen within the molten material at the zone at which the material is being heated by said rearranged flame, to continue the exothermic oxidation reaction of refining.

16. The method of claim 15, which further comprises directing a second jet of oxygen at subsonic velocity to surround said first jet of oxygen, for separating said first jet of oxygen from the combustion products formed within the combustion chamber.

17. The method of claim 14, 15 or 16 wherein each step further comprises determining the most economical point at which to proceed to the next step.

18. The method of claim 14, 15 or 16 which further comprises providing a plurality of such flames and oxygen jets, according to said method, in one furnace.

19. A hydrocarbon fluid fuel burner to reduce the consumption of fuel and pure oxygen in a heating process, which comprises:
a combustion block having a combustion chamber therein;
means for cooling said combustion chamber with a liquid;
means for separately supplying hydrocarbon fluid fuel and two oxygen based oxidizing gases to said combustion block;
means for directing said first oxidizing gas in a jet along the central axis of said combustion chamber;
means for directing said hydrocarbon fuel into said combustion chamber in a plurality of jets about the central jet of said first oxidizing gas so that said hydrocarbon fuel is caused to be mixed with said first oxidizing gas to stabilize combustion within said liquid cooled combustion chamber; and
means for directing said second oxidizing gas into said combustion chamber in a plurality of jets directed to mix inside said combustion chamber with said hydrocarbon fuel in the flame core and to mix with the hydrocarbon fuel outside said combustion chamber, creating the final flame pattern.

20. The burner of claim 19 wherein said means for directing said first oxidizing gas includes means for introducing said first oxidizing gas in a supersonic jet.

21. The burner of claim 19, which further comprises a means for controlling the flow of said hydrocarbon fuel and said two oxidizing gases to provide the required heat input, combustion product chemistry and combustion block temperature.

22. The burner of claim 20, which further comprises a means for controlling the flow of said hydrocarbon fuel and said two oxidizing gases to provide the required heat input, combustion product chemistry and combustion block temperature.

23. The burner of claim 21, wherein said means for controlling flow comprises:
means for controlling the ratio of fuel to total oxygen in said two oxidizing gases to enable efficient use of both said fuel and said oxidizing gases; and means for controlling the ratio of air to total oxygen in said two oxidizing gases for controlling the temperature of the hydrocarbon flame.

24. The burner of claim 23, wherein said flow controlling means further comprises means for controlling the ratio of hydrocarbon fuel to the oxygen in said first oxidizing gas for controlling the emissivity of the hydrocarbon flame.

25. The burner of claim 24, wherein said means for controlling flow further comprises means for maximizing the ratio of air in said second oxidizing gas to the air in said first oxidizing gas for minimizing NOx emissions by reducing the amount of air inside the core of the hydrocarbon flame.

26. The burner of claim 21, 22, 23, 24 or 25 which further comprises means for sensing the current process temperature for determining the stage of the process and the ratio to be applied by said flow controlling means.

27. The burner of claim 26, wherein said flow controlling means further comprises an electronic computing means for continuously determining how to apply said flow controlling means based on inputs from said burner and preprogrammed information.

28. The burner of claim 19 wherein said combustion block is made of a high thermal conductivity material.

29. The burner of claim 28 wherein said high thermal conductivity material is copper.

30. The burner of claim 19, wherein said means for directing said first oxidizing gas comprises a relatively narrow channel through said combustion block from the back of said combustion block along the central axis of said combustion block to the combustion chamber in gas transport connection relationship with said supply means of said first oxidizing gas.

31. The burner of claim 30, wherein said means for directing said hydrocarbon fuel comprises a plurality of relatively narrow channels through said combustion block from the back of said combustion block to the combustion chamber, spaced around said first oxidizing gas channel and angled towards the central axis of said combustion block, in fluid transport connection relationship with said supply means of said hydrocarbon fuel.

32. The burner of claim 31, wherein said means for directing said second oxidizing gas comprises a plurality of relatively narrow channels through said combustion block from the back of said combustion block to the combustion chamber spaced radially outward from said hydrocarbon fuel channels and angled toward the central axis of the combustion chamber of said combustion block, in gas transport connection relationship with said supply means of said second oxidizing gas.

33. The burner of claim 32, wherein the combustion chamber of said combustion block is generally conical with the wider end at the face of said burner, and wherein said second oxidizing gas channels open onto the conical face of the combustion chamber to create film cooling.

34. The burner of claim 19, 20, 21, 22, 32, or 33 wherein a plurality of said burners are utilized in a furnace.

35. An economizing method of hydrocarbon fluid fuel combustion in an ongoing hydrocarbon flame formed in a combustion chamber within a fluid cooled combustion block and extending into a hot furnace chamber, to reduce the consumption of fuel and pure oxygen in heating processes, by comprising the steps of:

separately supplying hydrocarbon fluid fuel and two different oxygen based oxidizing gases to the combustion chamber;
directing said first oxidizing gas in a jet along the central axis of the combustion chamber;
directing said hydrocarbon fuel into said combustion chamber about the central jet of said first oxidizing gas so that said hydrocarbon fuel is caused to be mixed with said first oxidizing gas to stabilize combustion within the combustion chamber;
directing said second oxidizing gas into said combustion chamber directed to mix inside said combustion chamber with said hydrocarbon fuel in the flame core, and to mix with the hydrocarbon fuel outside said combustion chamber, creating the final flame pattern;
controlling the ratio of fuel to total oxygen in said two oxidizing gases to enable efficient use of both said fuel and said oxidizing gases; and
controlling the ratio of air to total oxygen in said two oxydizing gases for controlling the temperature of the hydrocarbon flame.

36. The method of hydrocarbon fluid fuel combustion of claim 35, wherein said flow controlling step further comprises the step of controlling the ratio of hydrocarbon fuel to the oxygen in said first oxidizing gas for controlling the emissivity of the hydrocarbon flame.

37. The method of hydrocarbon fluid fuel combustion of claim 36, wherein said flow controlling step further comprises the step of maximizing the ratio of air in said second oxidizing gas to the air in said first oxidizing gas for minimizing NOx emissions by reducing the amount of air inside the core of the hydrocarbon flame.

38. The method of claim 37, wherein said controlling steps are accomplished by electronic computer means.

39. The method of hydrocarbon fluid fuel combustion of claim 35 or 36 wherein said first oxidizing gas is pure oxygen.

40. The method of hydrocarbon fluid fuel combustion of claim 35, 36 or 37 which further comprises the step of controlling the delivery of said first oxidizing gas into the combustion chamber such that the velocity of the jet entering the combustion chamber may range from subsonic to supersonic.

41. An economizing method of hydrocarbon fluid fuel combustion in an ongoing hydrocarbon flame formed in a combustion chamber within a fluid cooled combustion block, to reduce the consumption of fuel and pure oxygen in heating processes, comprising the steps of:

separately supplying hydrocarbon fluid fuel and two different oxygen based oxidizing gases to a fluid cooled combustion chamber;
directing said hydrocarbon fuel in a jet along the central axis of the combustion chamber;
directing said first oxidizing gas having a given oxygen concentration into said combustion chamber in a stream directed about said hydrocarbon fuel so that said hydrocarbon fuel is caused to be mixed with said first oxidizing gas to stabilize combustion within the combustion chamber;
directing said second oxidizing gas having different oxygen concentration from said first oxidizing gas into said combustion chamber in a stream directed about and toward said flame core; and
controlling the flow of said hydrocarbon fuel and said two oxidizing gases.

42. The method of hydrocarbon fluid fuel combustion of claim 41, wherein said flow controlling step comprises the steps of:
controlling the ratio of fuel to total oxygen in said two oxidizing gases to enable efficient use of both said fuel and said oxidizing gases; and
controlling the ratio of air to total oxygen in said two oxidizing gases for controlling the temperature of the hydrocarbon flame.

43. The method of hydrocarbon fluid fuel combustion of claim 42, wherein said flow controlling step further comprises the step of controlling the ratio of hydrocarbon fuel to the oxygen in said first oxidizing gas for controlling the emissivity of the hydrocarbon flame.

44. The method of hydrocarbon fluid fuel combustion of claim 43, wherein said flow controlling step further comprises the step of maximizing the ratio of air in said second oxidizing gas to the air in said first oxidizing gas for minimizing NOx emissions by reducing the amount of air inside the core of the hydrocarbon flame.

* * * * *